United States Patent [19]

Mader

[11] Patent Number: 4,526,636
[45] Date of Patent: Jul. 2, 1985

[54] METHOD OF REPAIRING BREAKS IN SHEET MATERIAL

[76] Inventor: Gerald J. Mader, 4560 S. Hydraulic, Lot 308, Wichita, Kans. 67216

[21] Appl. No.: 614,526

[22] Filed: May 29, 1984

[51] Int. Cl.³ ............................................... B32B 35/00
[52] U.S. Cl. ...................................... 156/94; 156/279; 156/280; 156/330.9; 264/36; 427/140; 427/189; 427/203; 428/63
[58] Field of Search .................... 156/94, 98, 278, 279, 156/280, 330.9; 264/36; 427/140, 189, 203; 428/63

[56] References Cited

U.S. PATENT DOCUMENTS

| | | |
|---|---|---|
| 2,951,773 | 9/1960 | Helle et al. ...................... 427/140 X |
| 3,478,791 | 11/1969 | Elmendore ...................... 427/140 X |
| 3,920,497 | 11/1975 | Speer ...................................... 156/94 |
| 4,133,913 | 1/1979 | Moore ................................... 427/140 |

*Primary Examiner*—Robert A. Dawson
*Attorney, Agent, or Firm*—Kokjer, Kircher, Bradley, Wharton, Bowman & Johnson

[57] ABSTRACT

A method of repairing breaks in plastic sheet members such as those used on dashes of automobiles. The abutting edges of the crack formed at the break are coated with a liquid cyanoacrylate adhesive. The crack is filled with a particulate material, preferably hardened polyurethane foam or graphite which has been ground to a particle size corresponding roughly to that of common table salt. The particulate filler is soaked with the liquid cyanoacrylate adhesive and the liquid is then dried. For cracks of substantial depths, several layers of filler soaked with the adhesive may be utilized to completely fill the crack. After the filler composition has completely hardened and the repair smoothed by sanding, the immediate zone may be textured by spraying with a liquid vinyl lacquer. When the lacquer is dry, the region may be painted to blend with the remainder of the member.

9 Claims, No Drawings

METHOD OF REPAIRING BREAKS IN SHEET MATERIAL

This invention pertains to a method of repairing broken articles, and more particularly to a method of preparing breaks in sheet members of plastic or composition materials or the like such as are commonly used in the fabrication of automobile dashes, door panels and similar items.

No effective method has heretofore been available to car owners for repairing dash panels and other decorative and functional panels in an automobile when these parts have been broken. The owner has usually been faced on such occasion with costly replacement of the part with a new part or, in the alternative, tolerating the broken part. Breaks of this kind in decorative articles are particularly unsightly and difficult to tolerate.

Any attempts to glue or otherwise repair such parts have usually resulted in even greater unsightliness as a result of the repair attempt. Further, most attempts have proven futile with the broken parts coming apart a short while after the repair has been accomplished.

Accordingly, it is an important object of the present invention to provide a method which effectively repairs broken parts such as automobile dashes and the like which overcomes the foregoing disadvantages typical of prior repairing methods.

In the achievement of the foregoing object, it is also an object of the present invention to provide such a method which effects permanent repair so that the break is not likely to reoccur.

A further object of this invention is to provide a method of repair which can be easily effected by relatively unskilled workers following instructions involving easy to accomplish procedures.

Yet another object of the invention is to provide a repair method which utilizes small quantities of specially prepared materials which can be packaged and furnished to the automobile owner in convenient kit form.

It is also an object of the present invention to provide a repair method which can be accomplished quickly and conveniently without the need for other than readily available tools.

These and other important aims and objectives of the present invention will be further explained or will become apparent from the following description and appended claims.

Prior to initiating the actual repair of broken members of this kind, it is usually desirable that the topography of the member adjacent the crack be restored to as near as possible the original configuration of the unbroken member. This often requires sanding of the member to smooth the crack region which may have become elevated as a result of forces released in the member as a result of the break. This is particularly the case in situations involving molded plastic members wherein internal stresses may have been molded in the object or where such stresses may be imparted to the object by its attachment to the automobile or other item where the panel is in use.

Once the necessary sanding has been accomplished, care should be taken to insure that the cracked region is clean of dust from the sanding operation and from other foreign material. The step of cleaning the crack area can usually be accomplished by the use of compressed air or, if necessary, the use of a liquid solvent such as paint thinner or the like. Any liquid cleaning material should be allowed to dry thoroughly before proceeding with the repair operation.

Next, the abutting edges of the broken member which define the crack are coated with a thin coating of liquid cyanoacrylate adhesive. Before the liquid adhesive is permitted to dry, a dry particulate material is placed into the crack. The preferred material for repairing members formed of plastic materials or fiberglass reinforced resinous material is hardened polyurethane foam material which has been ground to a point where the individual particles are about the size of the grains of common table salt.

It is desirable that the depth of the particulate material installed in the crack be kept to no more than about one-fourth inch. In the event that the thickness of the broken member is such that the crack has a greater depth than one-fourth inch, the bottom of the crack may be stuffed with paper or similar filler to bring the cracked bottom to approximately one-fourth inch from the surface of the member to be repaired prior to the installation of the particulate material into the crack.

Next, the particulate material in the crack is saturated thoroughly with liquid cyanoacrylate adhesive. Care should be taken during this step to insure that only sufficient liquid adhesive is applied to the particulate material as is necessary for such saturation. Any excess or overflow of the adhesive should be wiped from the member immediately.

The adhesive in the crack is then permitted to completely dry or harden. Usually air drying of the adhesive is sufficient for this purpose and the time required for this step will obviously depend upon ambient conditions. It is possible to utilize artificial currents of heated air, such as can be derived from commonly available hair drying appliances, for this purpose.

In the event that the hardened composition does not completely fill the crack, the step of applying the particulate material in the crack followed by saturation of the material with liquid cyanoacrylate adhesive then permitting the adhesive to dry is repeated until the crack is completely filled. For particularly deep or thick cracks, the foregoing steps are repeated in sequence until the crack is fully filled to the surface.

Occasionally, it is necessary to repair cracks in sheet members as, for example, may be employed in automobile dashes wherein the sheet member is backed with a layer of foam rubber or other similar material. In such cases, it has been found desirable to soak the foam material immediately adjacent the cracked bottom with the liquid cyanoacrylate adhesive material prior to the step of coating the cracked edges with the adhesive and the placement and subsequent saturation of the particulate filler material in the crack. This procedure provides the beneficial effect of bonding the foam material to the crack filling and repairing composition. It has also been found desirable in cases where the crack is quite narrow to utilize a syringe for the purpose of applying the liquid adhesive. The syringe makes possible the application of the adhesive to precisely the desired location and reduces the likelihood that the adhesive may inadvertently flow onto portions of the broken member which are not intended and which could result in harm to the latter.

After the crack is completely filled and the repairing composition has dried, the area in the vicinity of the repair should be thoroughly sanded so that it is smooth and blends with the unbroken portions of the member.

If the member has a textured surface, as is the case with most automobile dashes, a texturing material such as vinyl lacquer may be lightly sprayed over the filled crack and immediate surrounding area. When the texturing coating has dried, the affected area is then ready for painting with a paint which matches the original color of the member.

It has been found that the method heretofore described results in repairs which not only restore the structural integrity of the broken member, but which are usually invisible after the repair procedure has been finished. While the procedure described has particular utility for automobile dashes and similar decorative panels, the procedure can also be used to good effect with a wide variety of broken sheet materials. For example, it has been found that the use of powdered polyurethane foam as a filler is well suited for repairing panels of most plastic materials. On the other hand, ground graphite having particle sizes corresponding generally to that desired above with respect to the pulverized polyurethane foam can be used to good advantage for making unobtrusive and strong structural repairs to broken dashes and similar articles having a large content of graphite material. The steps of making repairs with the graphite material are the same as described above with respect to the use of polyurethane foam as a filler, with the exception that the ground graphite is substituted therefore.

It has been found that all of the materials required for performing the repair method of this invention can be conveniently packaged and made available to potential users in convenient kit form. The cyanoacrylate adhesive and the vinyl lacquer can be provided in separate bottles containing about the required amounts. Dry material packaging is adequate for the particulate filler materials which are preferably pre-ground in relatively large quantities at a central site and furnished in the quantities needed in a small envelope or the like.

Equipment such as syringes for carefully applying the liquid adhesive and a sprayer to be used with the vinyl lacquer may also be provided in the kit along with sandpaper for the smoothing operation. It has also been found desirable to include in the kit protective articles such as rubber gloves to minimize the risk that any of the materials might come in harmful contact with the skin of those using the materials to make the repairs. Instructions for performing the repair method are also included in the kit, making it possible for purchasers to conveniently and easily repair damage of a type which has heretofore been virtually irrepairable or wherein the repairs have been less than satisfactory.

Having described the invention, what is claimed is:

1. A method of repairing breaks in sheet members resulting in a crack between the spaced apart portions of the members, said method comprising the steps of:
   coating the crack defining edges of said portions with a liquid cyanoacrylate adhesive;
   immediately thereafter and before said coating is dry, filling the crack with particulate material;
   soaking the particulate material in the crack with said liquid cyanoacrylate adhesive; and
   drying said adhesive to form a hardened filler in the crack and adhered to said edges, thereby joining the portions.

2. The method of claim 1, wherein said particulate material is derived by the step of grinding hardened cellular polyurethane foam.

3. The method of claim 2, wherein said particulate material is ground to reduce the size of said particles to about the size of the grains of common table salt.

4. The method of claim 1, wherein said particulate material is ground graphite.

5. The method of claim 1, wherein the graphite particles are about the size of the grains of common table salt.

6. A method of repairing breaks in sheet members which result in a crack between spaced apart portions of the members, said method comprising the steps of:
   coating the crack defining edges of said portions with a liquid cyanoacrylate adhesive;
   before said adhesive coating has dried, placing a layer of particulate material in the crack, the particles of said material being about the size of common table salt;
   soaking the particles in the crack with liquid cyanoacrylate adhesive;
   drying said adhesive;
   repeating the steps of applying a layer of said particulate material followed by soaking said material with said adhesive and then letting the soaking adhesive dry until the crack is completely filled with hardened adhesive and particulate material composition;
   sanding the composition and adjacent regions of the member to smooth the junction therebetween; and
   applying a texturing coating over the repaired area.

7. The invention of claim 6, wherein said texturing coating is a vinyl lacquer.

8. The invention of claim 6, wherein said texturing coating is applied to the repaired area by the step of spraying liquid vinyl lacquer over said area.

9. The invention of claim 8, wherein is included the step of painting the repaired area to match the color of said member.

* * * * *